US009132342B2

(12) United States Patent
Balachandreswaran et al.

(10) Patent No.: US 9,132,342 B2
(45) Date of Patent: Sep. 15, 2015

(54) DYNAMIC ENVIRONMENT AND LOCATION BASED AUGMENTED REALITY (AR) SYSTEMS

(71) Applicant: SULON TECHNOLOGIES INC., Markham (CA)

(72) Inventors: Dhanushan Balachandreswaran, Richmond Hill (CA); Kibaya Mungai Njenga, Markham (CA)

(73) Assignee: SULON TECHNOLOGIES INC., Markham (CA)

( * ) Notice: Subject to any disclaimer, the term of this patent is extended or adjusted under 35 U.S.C. 154(b) by 0 days.

(21) Appl. No.: 13/847,343

(22) Filed: Mar. 19, 2013

(65) Prior Publication Data

US 2014/0287806 A1    Sep. 25, 2014

Related U.S. Application Data

(60) Provisional application No. 61/720,585, filed on Oct. 31, 2012.

(51) Int. Cl.
| | |
|---|---|
| G09G 5/377 | (2006.01) |
| A63F 13/00 | (2014.01) |
| A63F 13/212 | (2014.01) |
| A63F 13/245 | (2014.01) |
| A63F 13/30 | (2014.01) |
| A63F 13/428 | (2014.01) |
| A63F 13/837 | (2014.01) |

(Continued)

(52) U.S. Cl.
CPC ............. *A63F 13/00* (2013.01); *A63F 13/212* (2014.09); *A63F 13/216* (2014.09); *A63F 13/245* (2014.09); *A63F 13/25* (2014.09); *A63F 13/30* (2014.09); *A63F 13/323* (2014.09); *A63F 13/426* (2014.09); *A63F 13/428* (2014.09); *A63F 13/52* (2014.09); *A63F 13/837* (2014.09); *G06T 19/006* (2013.01); *A63F 13/213* (2014.09); *A63F 13/217* (2014.09); *A63F 13/28* (2014.09); *A63F 2300/8082* (2013.01)

(58) Field of Classification Search
CPC .................. A63F 2300/301; A63F 2300/6676; A63F 2300/69; A63F 13/00; G06T 19/006; G02B 2027/0178; G02B 2027/0187; G02B 27/017; G02B 2027/0138; G02B 2027/014; G06F 3/012; G06F 3/011; G01J 1/0219; G01J 1/0242
USPC .................................. 463/1, 7, 30–34, 40–42
See application file for complete search history.

(56) References Cited

U.S. PATENT DOCUMENTS

| | | |
|---|---|---|
| 5,423,554 A | 6/1995 | Davis |
| 6,094,625 A | 7/2000 | Ralston |

(Continued)

OTHER PUBLICATIONS

Written Opinion of the International Searching Authority issued Jan. 12, 2015 for PCT/CA2014/050905.

(Continued)

*Primary Examiner* — Justin Myhr
(74) *Attorney, Agent, or Firm* — Bhole IP Law; Anil Bhole

(57) ABSTRACT

A multi dynamic environment and location based active augmented/mixed reality (AR) gaming system having means to utilize its surrounding environment and locations of other systems and devices in conjunction with computer based advanced calculation and graphics to dynamically change the gaming environment to any location and environment of a game play.

14 Claims, 23 Drawing Sheets

(51) Int. Cl.
  *A63F 13/25* (2014.01)
  *A63F 13/426* (2014.01)
  *A63F 13/216* (2014.01)
  *A63F 13/52* (2014.01)
  *A63F 13/323* (2014.01)
  *G06T 19/00* (2011.01)
  *A63F 13/213* (2014.01)
  *A63F 13/28* (2014.01)
  *A63F 13/217* (2014.01)

(56) References Cited

U.S. PATENT DOCUMENTS

| | | | |
|---|---|---|---|
| 6,261,180 B1 * | 7/2001 | Lebensfeld et al. | 463/49 |
| 7,190,330 B2 | 3/2007 | Travers et al. | |
| 7,190,331 B2 | 3/2007 | Genc et al. | |
| 1,980,999 A1 | 10/2008 | Van Berlo | |
| 8,469,824 B1 * | 6/2013 | Farley et al. | 463/53 |
| 2006/0223635 A1 * | 10/2006 | Rosenberg | 463/37 |
| 2007/0035563 A1 | 2/2007 | Biocca et al. | |
| 2008/0062069 A1 | 3/2008 | Sinclair et al. | |
| 2008/0204361 A1 * | 8/2008 | Scales et al. | 345/8 |
| 2010/0208033 A1 * | 8/2010 | Edge et al. | 348/46 |
| 2011/0065496 A1 | 3/2011 | Gagner et al. | |
| 2011/0216060 A1 | 9/2011 | Weising et al. | |
| 2012/0142415 A1 * | 6/2012 | Lindsay | 463/33 |
| 2012/0244939 A1 | 9/2012 | Braun | |
| 2012/0249797 A1 | 10/2012 | Haddick et al. | |
| 2013/0083008 A1 * | 4/2013 | Geisner et al. | 345/419 |
| 2013/0095924 A1 * | 4/2013 | Geisner et al. | 463/32 |
| 2013/0215230 A1 | 8/2013 | Miesnieks et al. | |
| 2013/0328927 A1 * | 12/2013 | Mount et al. | 345/633 |
| 2014/0256436 A1 * | 9/2014 | Greyer et al. | 463/36 |

OTHER PUBLICATIONS

International Search Report issued Jan. 12, 2015 for PCT/CA2014/050905.

* cited by examiner

Top View Cross-Section View

DYNAMIC ENVIRONMENT AND LOCATION BASED AUGMENTED REALITY (AR) SYSTEMS

RELATED APPLICATION

The present invention was first described in U.S. Provisional Patent No. 61/720,585 filed on Oct. 31, 2012.

FIELD OF INVENTION

The present invention is related to a multi dynamic environment and location based active augmented reality (AR), mixed reality, and virtual reality gaming system. The system utilizes its surrounding environment and the locations of other systems and devices in conjunction with computer based advanced calculations and graphics to dynamically change the gaming environment to any game play environment.

BACKGROUND OF THE INVENTION

Augmented reality is a technology that develops a virtual view of the real world with virtual objects. View of the real environment is superposed by a virtual image that is matched with the reality image then combined to form an augmented reality image.

Augmented reality technology is also used in live programs to add extra information to the viewer like text and photos. Nowadays augmented reality is used in many TV programs especially in sports games for simulation of the motion of a player.

Augmented reality is related to a more general concept called mediated reality, in which a view of reality is modified (possibly even diminished rather than augmented), by a computer. With the help of advanced AR technology (vision and object recognition) the information about the surrounding real world of the user becomes interactive and can be digitally manipulated. Any artificial information about the environment and its objects can be overlaid on the real world.

A more advanced dynamic augmented reality system, which the user typically wears a head mounted display, comprises of glasses with specific equipment through which a user sees the environment and on which the virtual image is projected.

SUMMARY OF THE INVENTION

The present invention analyzes its surrounding environment (which includes walls, rooms, doors, trees, hallways, or other physical media) in 2D or 3D and develops an algorithm of varying gameplay, obstacles, characters, and other advanced graphics to add into the augmented environment. Then using its local positioning system, it can determine the exact location of each system or device and create a virtual game environment for all users of play. The system analyzes the environment with its array of sensors and actuators to develop and map its environment. The system then uses a sense of artificial intelligence and or learning algorithms to give a dynamic and adaptive game play in changing unknown environments and locations.

Computer generated virtual and augmented worlds or special effects are superimposed or overlaid onto the live physical environment(s). This is created by the system's visual sensors, and other physical mapping sensors, that are later described, so that it can learn about its environment. This is usually accomplished during game play or during a calibration procedure before game play begins. The system consists of 3 main devices: a visor, receiver(s) and emitter(s); however other devices can be used to help develop a flexible gaming environment for other game(s) or simulation system(s).

The system utilizes the three high tech devices to create a level of game play or training that occurs simultaneously through real world environment sensor inputs and computer generated augmented special effects and or virtual worlds. The system uses the three hardware devices to create an interactive system with which the real life environment can be mapped, augmented, graphically altered, interacted, etc. to provide a greater level of game play. Each system shares its coordinates and stats with the other system(s) within the game through a wired and or wireless communication link back to a possible additional central game management station, known as the central console. Each system will be able to interact with the other systems through their respective location, positioning, orientation and individual generated and explored maps and will map out a virtual or augmented layout of the state, coordinates and other peripherals of the other systems in the similar or non-similar environments. Using algorithms, user will be able to be on the same map through the central console. The impact of each respective device in a particular system by another device will be determined by physical or nonphysical Computer-Generated-Imagery (CGI) feedback.

BRIEF DESCRIPTION OF THE DRAWINGS

Embodiments herein will hereinafter be described in conjunction with the appended photos provided to illustrate and not to limit the scope of the claims, wherein like designations denote like elements, and in which;

DETAILED DESCRIPTION OF THE PREFERRED EMBODIMENTS

The present invention is based on a dynamic environment and location in which the Augmented Reality (AR) system allows users to be in an actively simulated or non-simulated indoor/outdoor augmented environment based on the system adaptively and dynamically learning the environment and location(s) surrounding it.

System Overview

Figure 1:
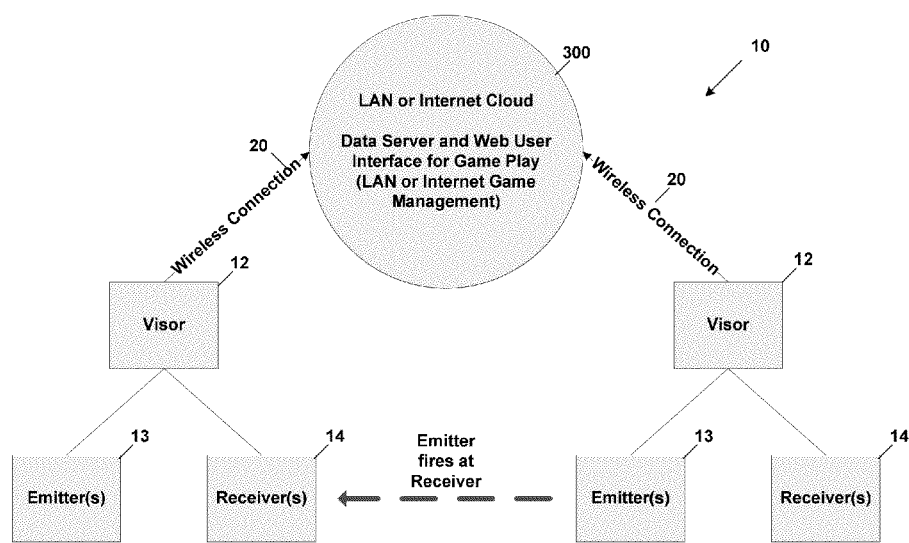
FIG. 1 shows system overview on a non-console approach, visors are directly interfaced to the internet or LAN for gameplay.
Figure 2:
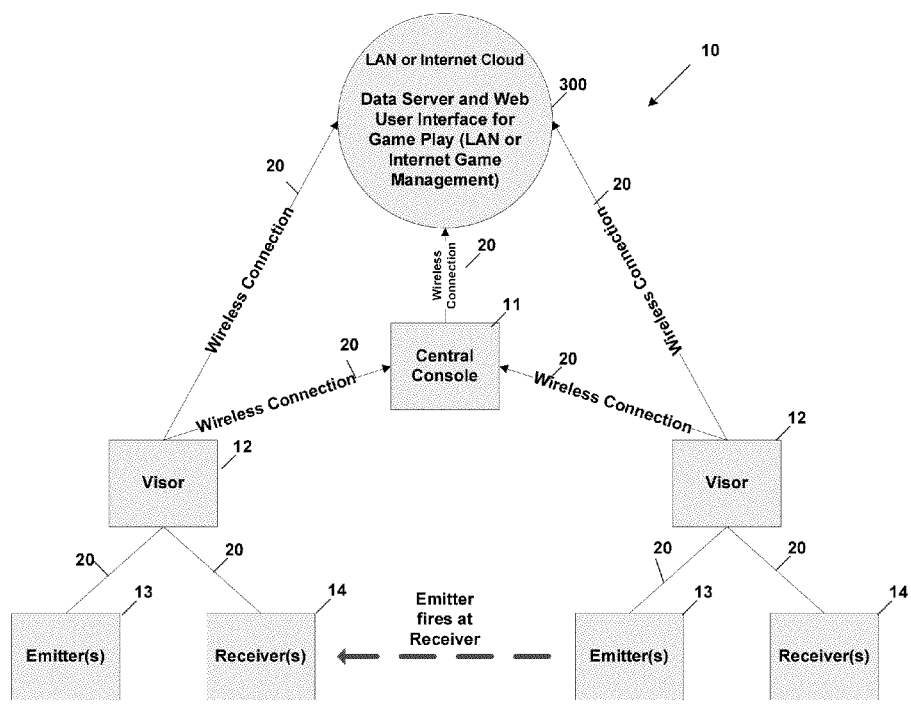
FIG. 2 shows system for computationally intensive and or graphically intensive game play, a console station can be used to distribute processing for a global gameplay using either centralized computing and or graphics rendering.

Referring to FIGS. 1 and 2, the system 10, comprises of a number of devices including a central console 11, a visor 12, and one or more accessories as needed based on the nature of use. Depending on the user, the system may or may not need a central console; the visor can act as the central console when computationally and or graphically intense gameplay is minimal or not required.

FIG. 1 shows the architecture of the full system 10, and how each device interacts with each other. The big circle 300, at the top is a local computer server connected to a local area network (LAN) or it is a server connected over the internet. This central server may manage game play parameters such as the global position of each player as well as player stats. Each system comprises of several sub-systems. Each subsystem comprises of, but not limited to, a visor 12, an emitter 13, and a receiver 14. A subsystem may be wirelessly connected to the central server 300 through the visor 12. The visor 12 acts as the master device to the emitter 13 and the receiver 14, which are slave devices. Users may interact with each other using the emitters 13 and receivers 14. One user uses his/her emitter 13 to fire an infrared (IR) beam at another user's receiver 14. Sensors on the receiver 14 receive and process this signal and send that information to the visor 12. The visor 12 then sends this information wirelessly to the central server 300 so it can update the global stats. There can be more than 2 users interacting with each other.

Referring to FIG. 2, the system 10 has a central console 11. This central console 11 is needed to process high level graphics as well as computationally intensive calculations. This eases the complexity of the system 10 since calculations are done locally. Each user's subsystem is connected wirelessly to this console 11 and the console 11 is connected wirelessly to the central server 300 to store information.

Again referring to FIG. 2, some examples of accessories are an emitter 13 and a receiver 14, among others. For example, in a game of laser tag, the laser tag gun can act as the emitter 13 and the laser tag receiver can be the vest which can be a combination of receivers. All devices will be fitted with processors, either microcontrollers and or microprocessors, to provide a means of system simplicity for device communication and as well as for providing a level of sub control to the devices. The console and or the visor can handle the physics, various game calculations, as well as the high level rendering and creation of graphics.

Communication 20 between the console 11 and visor 12 is possible with either a wired or wireless connection. The console 11 will be the master device when connected to the system, otherwise the visor 12 will be the master device. All other accessories will be slave devices to the visor 12. The accessories can be connected to the visor through a wired or wireless connection 20. When the console 11 is connected to the system 10, it will act as the central server and will be connected to the visor 12 wirelessly.

The central console 11 collects any type of data common to all subsystems in the field. For example, in a game of laser tag, individual and team score will be collected and processed by the central console 11. Also, the central server 11 solves any conflicts that occur between subsystems in the field, especially conflicts that involve time. For example, during a laser tag game, two players may tag each other at the same time. The central server 11 will have a higher level of time accuracy so it will be able to determine who tagged who first based on the timestamps of the tags. Other conflicts that may be solved involve positioning and mapping. When two players are in the same area, they will be on the same map. The central server 11 will make sure the players are positioned correctly on the map so any CGI effects produced make sense.

Since mapping is dynamic, one room is able to provide one or more unique environments using Computer-Generated-Imagery (CGI). For example, if a player is playing a game where the walls are based in medieval times, he or she may enter the room and the walls may be just brick, but when the player exits the room and re-enters, the walls may now be brick with flora growing on them. This implies that the user is in another part of the game, however, in the same physical environment. This allows for essentially an infinite amount of augmented environments that the system can produce with a fixed number of physical environments.

When looking through the visor 12 the user sees an augmented view of a physical environment. The augmentation can be generated by the visor 12 or by the central server 11. Users will be able to see the same types of augmentation. For example, in a game of augmented reality laser tag, if a player is behind another player, the player in front will be able to see the augmented laser beam fired by the player from behind.

A Laser Range Finder (LRF) will be used to map out a user's environment in 2D or 3D and store that map locally on the visor 12 or on the console 11. The laser will scan the environment ahead of the user so any CGI can be rendered by the time the user reaches the environment ahead. The LRF, along with ultrasound, Radio-Frequency Identification (RFID), magnetic, and or other wireless communication protocols will be used as a Local Positioning System (LPS) in 2D or 3D space positioning. This will allow users to know where each player is on the same map as well as their respective accessories that require global positioning.

Central control station 11 can perform a wide variety of central play calculations, algorithms, game management, etc. to ease complexity of the system. Each player accessories position is known through space. Emitters 13 give real life feedback to the user through advanced actuators and sensors. Receivers 14 react to emitters 13 by providing user feedback through advanced actuators and sensors.

Figure 3:
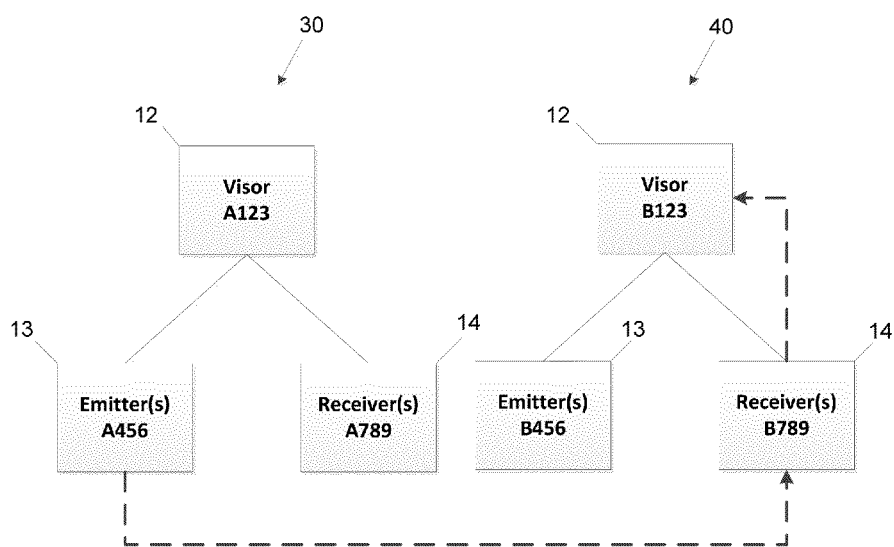
FIG. 3 shows two systems and their components in laser tag game.

For example in laser tag game, a subsystem 30 comprises of three devices, a visor 12 an emitter 13 and a receiver 14. The subsystem 30 is in a game of laser tag with another subsystem 40. Each device will be tagged to a unique serial ID and when an impact is updated for a particular device, other devices will receive the respective status update based on the projection of the unique serial ID of the device that is hit. For example, as shown in FIG. 3, subsystem 30 has a visor 12 with ID# A123, an emitter 13 with ID# A456 and a receiver 14 with ID# A789. Subsystem 40 has a visor 12 with ID# B123, an emitter 13 with ID# B456 and a receiver 14 with ID# B789. Assume the users of these subsystems are playing a game of laser tag. If the user of subsystem 30 tags the user of subsystem 40 this will be interpreted as device A456, 13 has tagged device B789, 14. Since the visor 12 is the master device, this information is sent from device B789, 13 to device B123, 12 to alert the user that they have been tagged.

Visor

Figure 4:
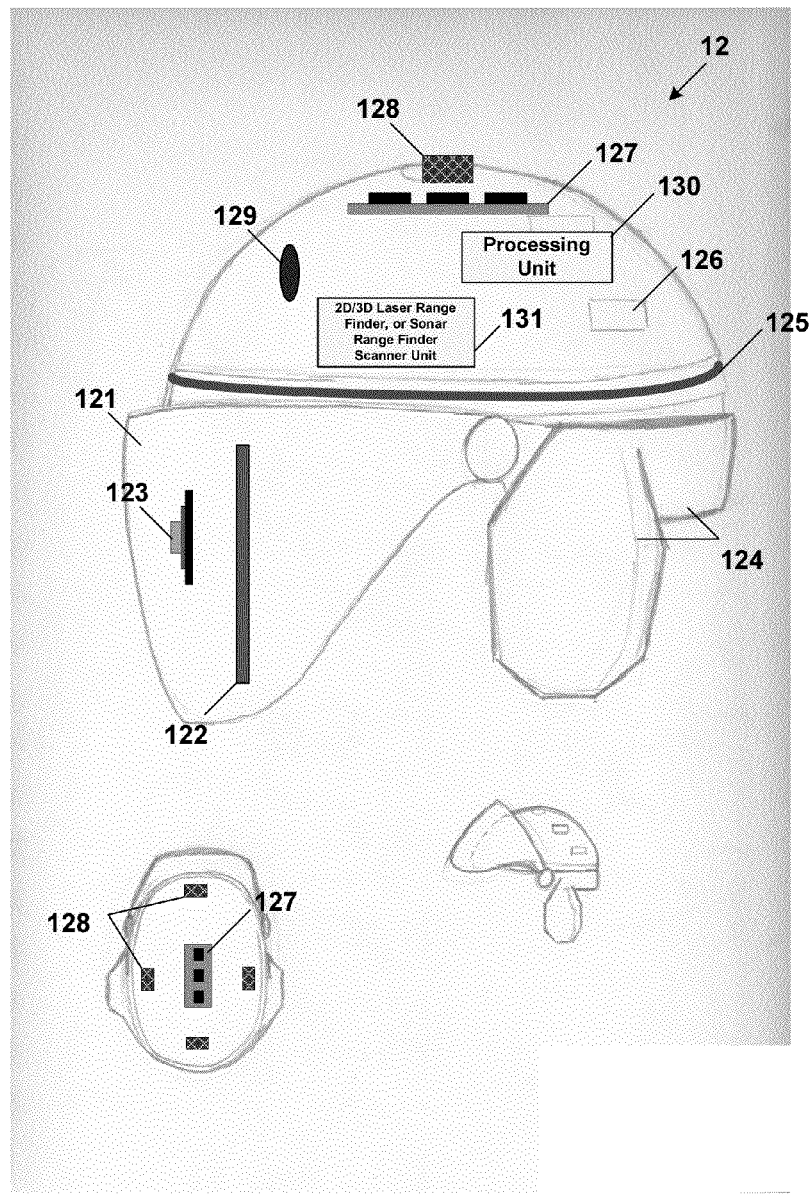
FIG. 4 shows side and top view of visor with components.

The visor 12 is responsible for many functions; it is responsible for obtaining and processing real world environment data and user locations by means to scan and calculate 2D/3D telemetry of the physical environments. As shown in FIG. 4, the visor 12 or a central console will calculate gameplay parameters and other functions for all devices or systems in play. The system will either share a global processing central console for CGI generated and rendered effects, or, each user will have their own independently created computer generated effects via their visor-based onboard graphics processor, various forms of inputs from other users, and the environment.

The visor 12 is equipped with multiplicity of equipment that collects data from environment and other equipment, analyses the collected data and executes some algorithms and makes some data and provides some result.

Again referring to FIG. 4, the visor 12 comprises of a display system 121, a camera system 123, a flat panel display 122, a surround sound system and microphone 124, with combined haptic feedback for alerts, an up to 360 degrees laser range finder scanner for 2D/3D mapping 125, a wireless communication hardware and antenna 126, a processing unit 130, a 2D/3D laser range finder scanner or sonar range finder scanner unit 131, an inertial measurement unit (3 axis accelerometer, compass and gyroscope) 127, a 2D/3D wireless local position system 128, that can be accomplished with ultrasonic, RF, magnetic or other wireless technologies. Furthermore the visor 12 also can be equipped with receivers 129.

Again referring to FIG. 4, the side and top view of how the different components of the visor 12 may be arranged. The visor 12 may be a variation of a helmet. On the top of the helmet may be a 2D or 3D wireless local positioning system (LPS) 128, using either ultrasonic signals, radio frequency (RF) signals, magnetic sensing, or another type of wireless or magnetic tracking technology. An LPS 128, using ultrasonic and RF signals may be realized by using a system that has one or more beacons. These beacons may transmit signals to a receiver located on the visor 12. This signal is then processed to produce a 3D coordinate of the beacon which in turn can give a 3D coordinate of the visor 12. The emitter and receiver devices may have a similar system.

Again referring to FIG. 4, a 9 degrees-of-freedom (DOF) inertial measurement unit (IMU) 127 may be on the helmet as well. This unit may read the direction, orientation, speed and/or acceleration of the helmet and send those signals back to the processor 130. A 2D or 3D laser range finder (LRF) 125 may be put on the front of the visor, or anywhere on the body, to map out the users environment. The helmet may have one or more LRFs 125. The LRF 125 sends a laser beam in the forward looking direction. The beam bounces off an object and is received again by the LRF. These three devices together may interact with each other to increase the accuracy of the user's position. A microcontroller or microprocessor may act as the processing unit 130.

Again referring to FIG. 4, the helmet may have some type of display system 121, for images to be projected on such as a liquid crystal display (LCD), light emitting diode (LED) display, an organic light emitting diode (OLED) display or some other sort of electronic display unit. The display unit may also consist of a piece of transparent, translucent, or opaque material where images are displayed onto from another location on the helmet. The display unit 121 may also consist of a camera system 123 that processes images in front and around the user. The visor 12 can also have receiver sensors 129. These sensor will be able to determine, for example, if another user has successfully fired upon a user's head, otherwise known as a "head shot". The helmet may also have an audio system 124 to give the user audible feedback.

Through the visor's visual display 121, the user can experience a view of an augmented reality world from looking through the visor 12. The user can view these visual outputs with full CGI rendered and generated effects.

Figure 5:
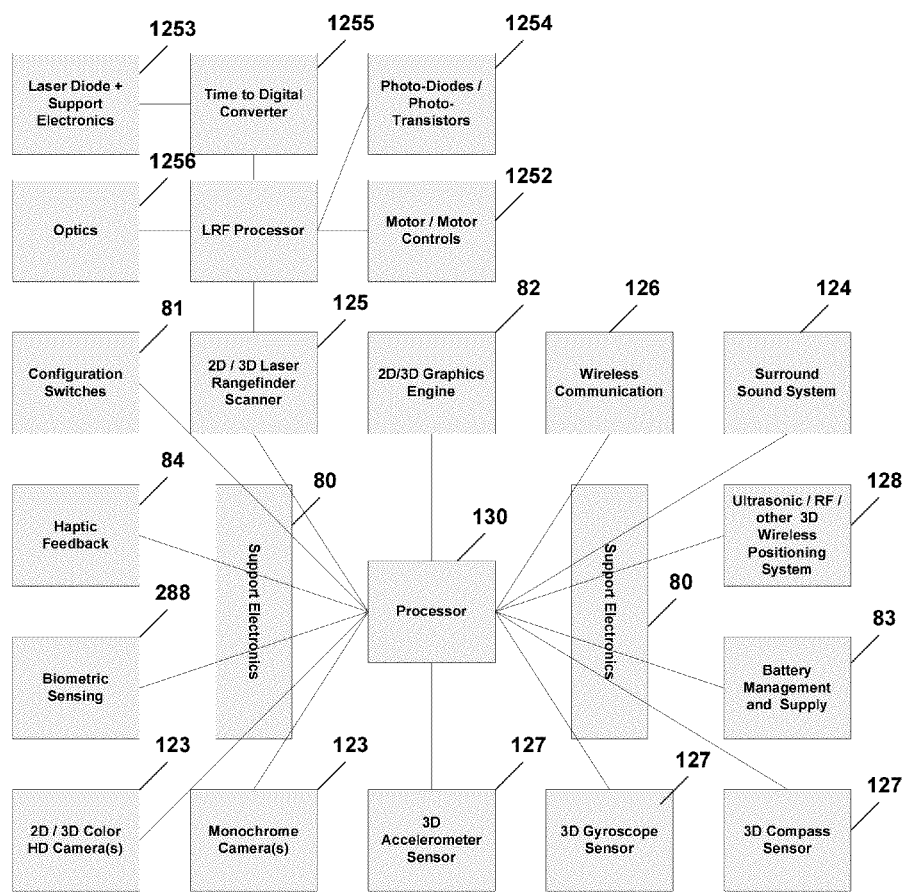
FIG. 5 shows sample block diagram of a visor with possible sub device interactions.

FIG. 5 shows a sample of how the visor 12 is interconnected. Each line represents a communication signal. Most components are connected directly to the processor 130 along with some support electronics 80. The configuration switches 81 may be pieces of hardware such as push buttons or touch sensors that will interface with the processor 130 that may allow the user to navigate through menu items that are displayed on the visor 12 or control some sort of option displayed on the visor 12. The graphics engine 82 processes the images that will be displayed on the users display unit. High rendered graphics can be processed using a central console. The battery management and supply unit 83 provides power to the visor as well as communication signals for management the amount of power used. The user may also experience haptic feedback 84 which may be some sort of vibration using vibrators. Monochrome cameras 123 may be used to filter out visible light and only pass IR light for image processing. The LRF scanner 125 has many components to it. It has its own processor 1251 that processes all the data related to the scanner 125. The scanner 125 may have mechanical motors 1252 which will be used for scanning. The laser diode 1253 fitted with support electronics, sends out a laser beam in the forward direction. The signal then bounces off an object and returns back to the scanner 125. Photodiodes or photo transistors 1254 may receive the signal. A time-to-digital converter or phase shift measurement 1255 may convert that signal to a digital time signal and send it back to the processor 1251. One way optics 1256, may be used is for collimating the outgoing beam of light and converging it as it returns. Also, optics 1256 may be used in the form of a beam splitter within the laser diode configuration to measure the time the light travelled.

Figure 6:
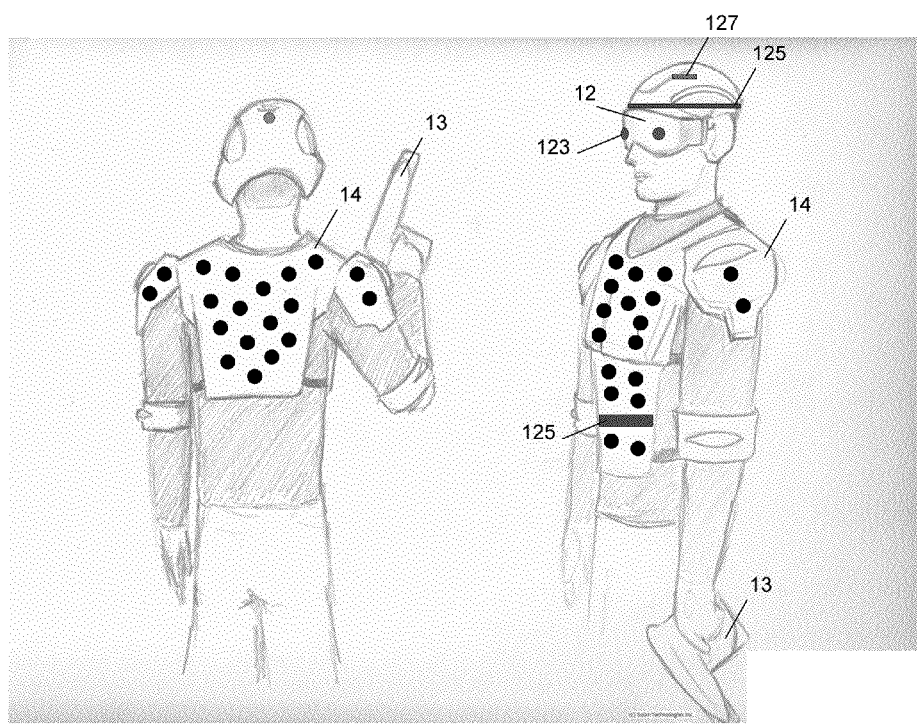
FIG. 6 shows back and side-front view of a user who is wearing a vest and a visor.

Referring to FIG. 6, the visor 12 can detect events in the game play world or on other users. Events in the game play world, which are CGI, can be generated by the visor 12 or the central console. Events on other users are detected using the receiver 14 which can be a vest. Output sensors are placed on or in the vest which transfer information to the visor's processor. For example, if the vest was hit with a laser tag gun, the vest's area of impact can signal infrared (IR) LEDs to turn on, and this creates an input parameter for the visor to see. The visor can see IR sources through image processing and can then create effects such as blood, gore, explosions, smoke or other forms of special effects in and around the area of impact. This can create a real-time live game environment which can provide amazing surreal effects between users.

Again referring to FIG. 6, the visor 12 can have a scanning laser rangefinder (LRF) or an ultrasonic rangefinder (USRF) 125 which maps out the environment by shooting a laser beam and calculating the time it takes to hit an obstacle and return or by the angle of the laser paths return. The scanning LRF 125 and/or the USRF 125 can map precisely the 2D or 3D environment based on obstacles, thereby allowing the user to navigate safely and accurately when interacting with the augmented reality space. It can scan and map long distances so that the system will know what is ahead before the user visibly notices the area or allowed to be visible by the visor's CGI effects or video inputs. The visor can create a "fog of war", limiting the view of the user to a certain distance (radius), as it calculates and develops the CGI required to create an environmental continuity by sensing obstacles outside of the visible radius of the user. The system can calculate and input game related characters, special effects, obstacles, etc., by having mapped and knowing the physical environment floor plan the users are situated in. Each user can generate their individual virtual map of the area they are exploring or the team can conjointly explore the same area via a singular mapping device, both of which can be stored in a central console. The scanning LRF 125 can see into corridors, doors, rooms, and even floors by looking scanning ahead, and mapping the area, and storing that data locally on the visor or globally on the central console. The system then uses the generated floor plan(s) to input game properties and parameters into the environment. As the players move across and explore a changing environment, the game learns and adapts to the newly created map(s).

Figure 7:
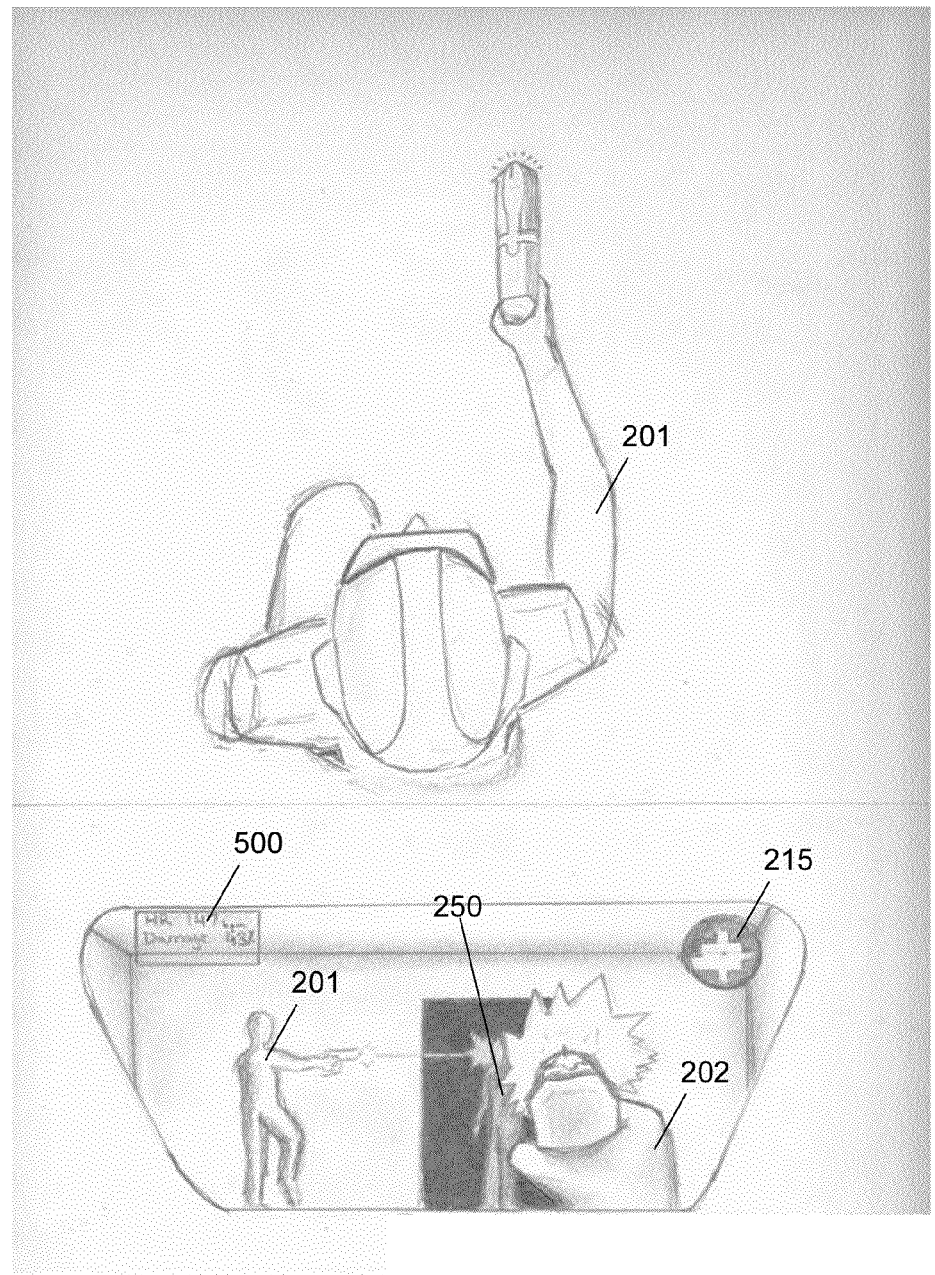
FIG. 7 shows top view of a user who is wearing a vest and a visor and user view of gameplay example showing the augmented play vs. real world view of play.

Referring to FIG. 7, example view of the visors biometric sensors 500 detecting the heart rate of the player as well as game level statistics such as damage level are shown. The system uses biometric sensors to provide a level of added realism to the game play by changing certain parameters of play to react to changes in heart rate. Also, real human players 201 and 202 or an augmented creature 250 created by central console station or locally at each visor can place game characters in play by sensing the map 215 of the dynamic environment through the systems dynamic mapping technology.

Figure 8:
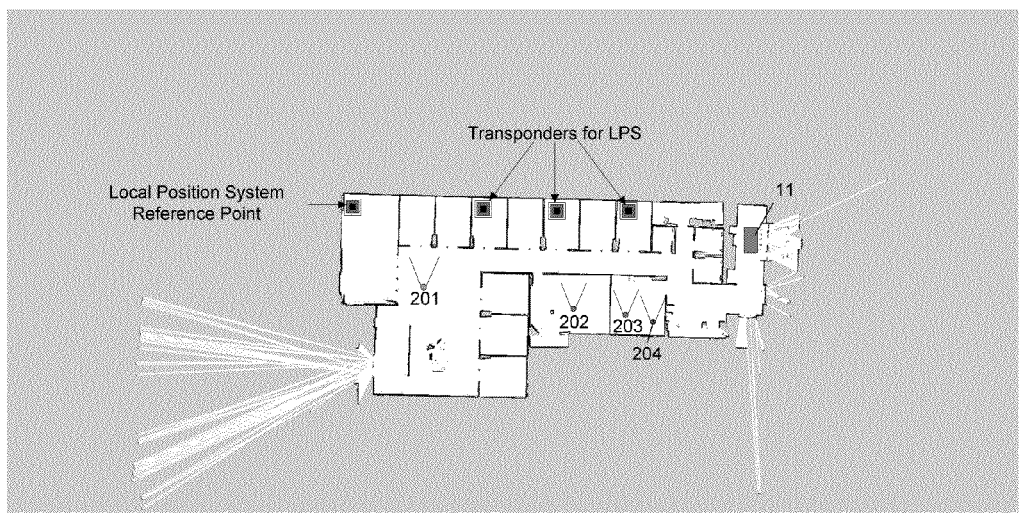
FIG. 8 shows sample representation of 2D map creation using a scanning laser range finder (LRF). The individual maps from each player are combined to make a central game map.

Referring to FIG. 8, as each player 201, 202, 203 and 204 explores the unknown map. The central console station 11 or at each local visor; the scanned physical mapped inputs from all users is being constructed to form a map of the area. The computer uses this information to dynamically add game material to the mapped locations. All Players of the game will share the explored maps, positions, orientation etc. with the central game management system which can be a console 11 or server based gaming engine. The game then uses this information to add global CGI effects and characters into the game play.

The visor 12 can detect events on other systems, such as damages to other players in a game of laser tag, through events calculated by the central console 11 or through the hardware on the receiver 14. For example, if a player is tagged, their laser receiver vest's output sensors will react to that and/or other forms of damage feedback on the vest. These images can be seen through the visor using the image processing engine. Events in the game play world, which are CGI, can be generated by the visor 12 or the central console 11. Events on other users are detected using the receiver 14 which can be a vest. Output sensors are placed on the vest which feeds back information to the visor's image processor 130. For example, if the vest was hit with a laser tag gun, the vest's area of impact can signal IR LED's to turn on, and this creates a visual input parameter for the visor to see. The visor 12 can see IR sources through image processing and filtering of IR visual inputs and can then create graphical overlay effects such as blood splatter, smoke or other forms of special effects in and around the area of impact. This can further create a real-time, game environment effects which can provide amazing surreal effects between the interactions of users.

The visor can have a measurement system with up to 9 degrees-of-freedom, developed using inertial measurement units (IMUs) 127 that can know the orientation, rotation, speed, altitude, etc. of the visor. Similarly, the emitter 13 and/or receiver 14 can also have an IMU device 127 which can give a greater level of feedback to the game. Furthermore, the precise location of the visor in 3D space can be determined using wireless triangulation and or time of flight calculation on different wireless technologies. For example, ultrasonic positioning systems can be used with very high precision to achieve up to 1 mm precision, and thus can allow very accurate and realistic gaming experience.

Visor Video and Imaging System

The system uses augmented reality by adding graphics, sounds, haptic feedback to the real world view. The visors are equipped with a camera system to detect and also record real live environments for the graphics engine(s) to prepare CGI to be augmented onto the real world video feed. The camera system can be made using several cameras of which can have separate but parallel functions. For example, the camera system not only detects visual cues of the real world, but also has a camera that "sees" and recognizes the pattern of IR LEDs being emitted by any emitter or other IR LED, which are then diagnosed by the visor's vision system. Once the type of IR LED emission behaviour is understood by the system, special graphics and effects can be generated and overlaid on top of these specific IR LEDs emissions. The overlaid effects can then be transferred to the user's display as visual AR effects modelled on to the real world environment. More specifically, with live action play in real time, the CGI images captured with the camera system are superimposed or overlaid onto the live action visual feed with augmented reality effects or CGI renderings and thus making it possible to relate it to the virtual materials in the surrounding augmented environment. The visors are also equipped with a transparent or non-transparent display to provide a stereoscopic heads-up display (HUD) of the environment.

Figure 14:
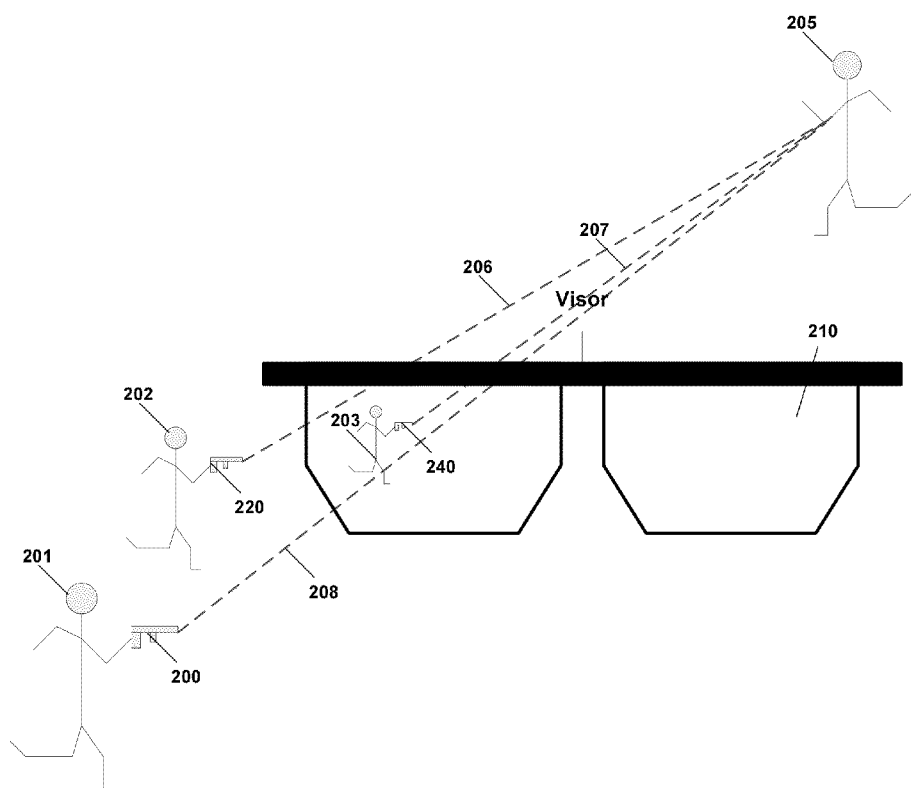
FIG. 14 shows demonstrating special effects through the visor with global effects being rendered and created to show different paths of laser tag virtual firing.

Referring to FIG. 14, a player's emitter 200 or other accessories can also be positioned in space to determine point with it lies in respect to the visor 210 and the base station. This is an essential requirement for global virtual effects by knowing where each accessory is in space and what action it is performing. For example, the emitter 200, 220, 240 with its positioning and 3 axis compass can let each user know where and what direction 206, 207 and 208, everyone is firing from regardless of if they are in the view of the visor 210. All users 201, 202 and 203 wearing the game visor can visually see special effects such as guns fires of their weapon and also all users in play by knowing the position of all accessories and users, the system can generate virtual global effects for all users regardless of their position. Real human player or augmented creature 205 created by central console station or locally at each visor can place game characters in play by sensing the map of the dynamic environment through the systems dynamic mapping technology.

Figure 15:
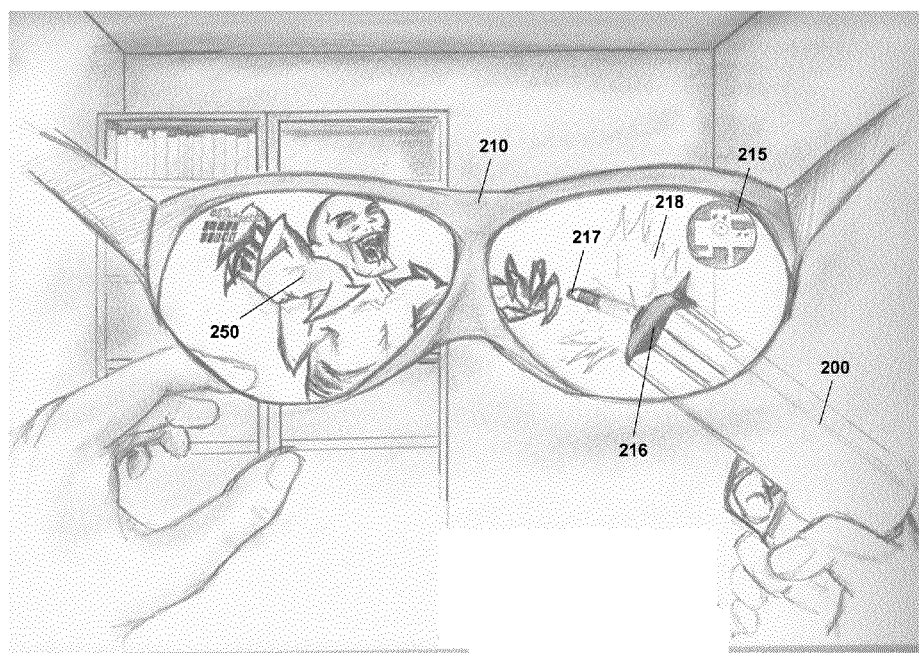
FIG. 15 shows CGI based special effects through visor during game play.
Figure 16:
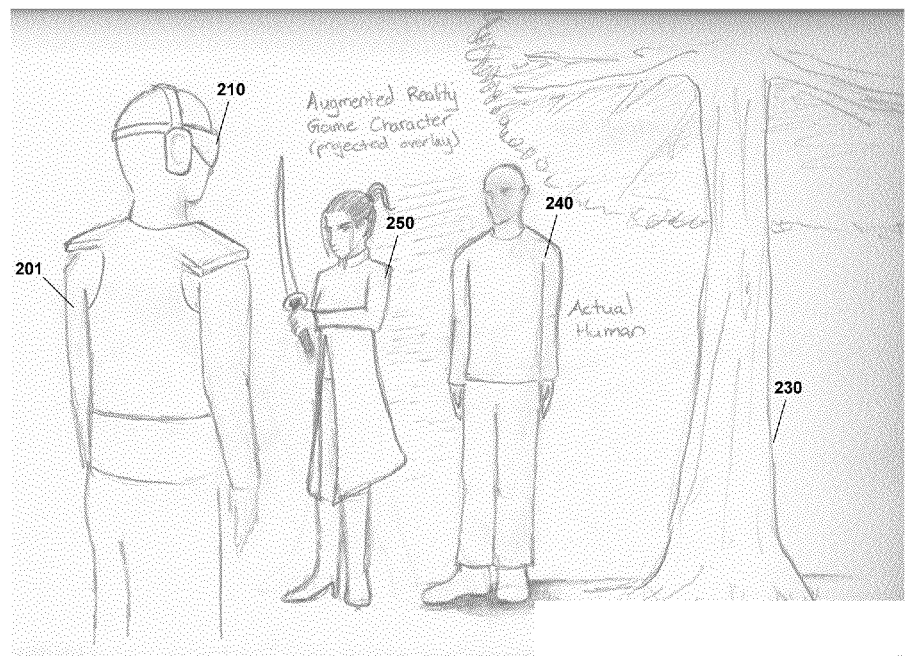
FIG. 16 shows a mix of real and augmented details happening during game play.

Referring to FIGS. 15 and 16, 3D computer animation combines 3D models of objects and programmed movement with these models being constructed out of geometrical vertices, faces, and edges in a 3D coordinate system. The display can represent different level progressions, missions and special effects such as mapping "zombies" and progressive scenery effect through CGI based on the analysis of the environment. Augmented creature 250 and augmented environment 230 created by central console station or locally at each visor 210 can place game characters in play by sensing the map 215 of the dynamic environment through the systems dynamic mapping technology. Color wheel 216 gives input for the image processing algorithm to develop special effects when the emitter 200 fires. FIG. 15 shows a CGI bullet firing 217, and as well as spark 218, and blast special effects. Standard civilian will not be able to see the effects of the game. The visor wearer 201 can wrap the civilian image to be anything the game requires such as transforming the face of the real human into a zombie or etc.

CGI animation which is within the realms of the simulated environment can be animated with techniques which consolidate related elements of animated entities into a set of attributes, such as creating effects of snow, rain, fog and etc. In short, procedural modelling can be used to capture the essence of various natural objects in the environment like the ruggedness of mountains, the wispy texture of clouds or even the rippling waves of bodies of water. This technique can be used to create simulations when in crowded areas, or used to create traffic in wide and barren areas. Cut scenes and cinematic are also possible. Expression based techniques can be used to automate graphical animation in a predictable way such as controlling facial and bone behaviour which would be quite useful for boss encounters and other game related characters. Enhancing texture mapping further adds surface texture, detail and colour to the computer generated imagery. The objects being generated into this system will be created as models, digitally scanned and rendered to give further detailing, texturing and shading.

An image generator is a software engine that is used to create 2D or 3D graphics of objects or characters. Once the image generator recognizes a physical object, there will be a delay before a user can actually see the image corresponding to a particular position. However, it is possible to keep this delay very small so that it is unnoticeable to the user of the visor. In order to achieve real-time interaction of the objects, the data from the camera(s) is kept in a buffer and is then made available to the image generator. The image generator's update rate is defined by a high frequency to provide a low latency visual output for the users. This time delay arises from the time required to walk through the hierarchical database and retrieve the relevant geometry, apply the perspective transformation and clip surfaces to the viewing volume, and render the image into the frames. Typically, once a wire frame object is created, the portions of the image are backward facing, behind another object, or otherwise hidden. Examples such as shadows can be filtered out through mathematical procedures. The image will then be shaded by computing intensities of light at each point on the surfaces, taking into account the location of light sources, the colour and distribution of reflected light, and even such features as surface roughness and the material of which the surface is made. In an interactive environment, especially if it is a simulated outdoor environment, many movable objects, such as flying creatures and the feet of game characters like "zombies", must be able to detect and respond to interactions with the terrain and other elements of the environment. For example, flying creatures might need to calculate long range trajectory out ahead of time in order to avoid collision with terrain features, while surface-situated objects such as flowing water, growing vines, and crawling insects must all stick to the terrain surface as they move around. Even material objects such as spears or bombs being hurled between the (active) interactive environment and hitting the ground consequently need to stick to, or into the terrain surface. These object-terrain interactions can be computed if the object's motion is primarily driven by the graphics processing unit from within a geometric shader, which is used primarily to calculate rendering effects on graphics hardware with a range of flexibility.

2D/3D Laser Range Finder Scanner

The visor can have a scanning LRF which maps out the environment by shooting a laser beam and calculating the time it takes to hit an obstacle and return, the scanning LRF can map precisely the 2D or 3D environment based on obstacles. It can also map extreme distances so that the system will know what is ahead before the user visibly notices the area or is allowed to be visible by the visor. The system can calculate and input common game related characters, special effects, obstacles, etc. via by knowing the environment floor plan the users are playing. Each user can generate their individual virtual map of the area they are exploring or the team can conjointly explore the same area via a singular mapping device, both of which can be analyzed and stored at the central console station. The scanning LRF can see into corridors, doors, rooms, and even floors by scanning ahead, mapping the area, and storing that data locally on the visor or globally to the central console. The system then uses the generated floor plan(s) to input game properties and parameters into the environment. As the users traverse and explore a changing environment, the game learns and adapts to the newly created map(s). The device can be built in several ways, but a traditional way of developing the LRF scanner requires some optical elements, safe class 1 laser sources, processors, motor+encoder to move and track the position during scan, and signal processing electronics to measure the time of flight of the speed of light down to fine millimeter ranges.

Figure 22:
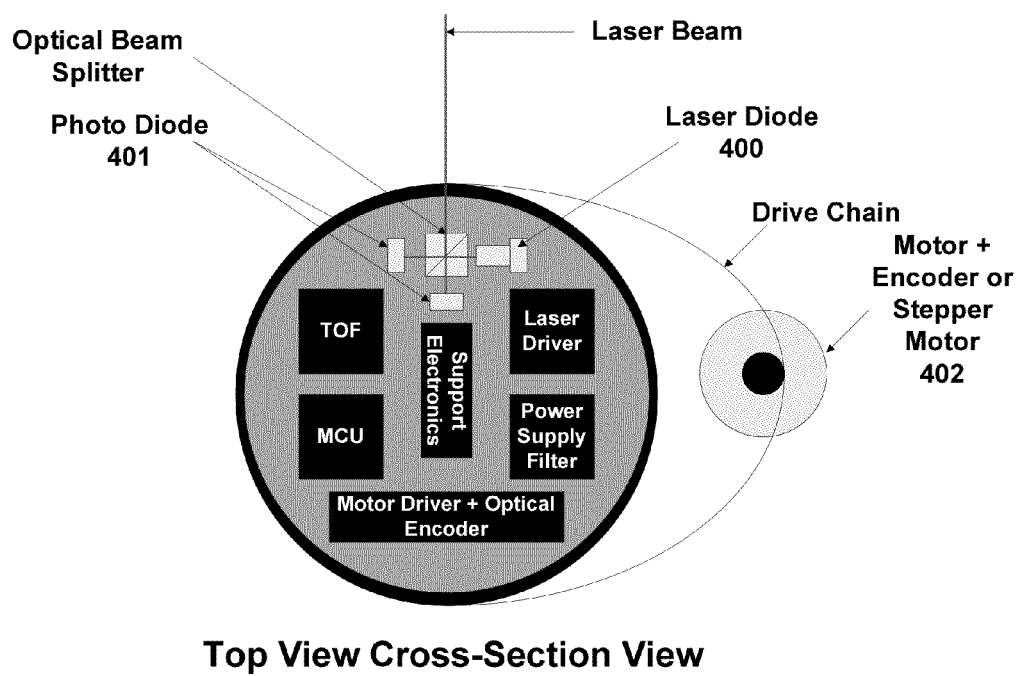
FIG. 22 shows HLD build diagram of the Laser Range Finder scanner.

Referring to FIG. 22, the laser diode 400 sends out a ray of light towards obstacles and as the light reflects back into the photodiode 401, the time of flight (TOF) of the laser path is timed and used to calculate the distance. The distance is calculated by $d=c*t/2$ where d=distance, c=speed of light, t=time of flight that divide it by two because light had to travel to the obstacle and back to the sensor so this is two trips and only 1 trip to determine distance is needed. The LRF system revolves around to gather up to 360 degrees of mapping information. The design is for a 2D mapping system. By adding another motor control 402 and some mechanical design as shown in FIG. 22, the system can be turned into a 3D mapping system. Time of flight can be developed using time to digital analysis.

Structured-light 3D scanners are used in conjunction with LRF scanner or alone. Structured-light 3D scanners project a pattern of light on the subject and look at the deformation of the pattern on the subject. The pattern is projected onto the subject using either an LCD projector or other stable light source. A camera, offset slightly from the pattern projector, looks at the shape of the pattern and calculates the distance of every point in the field of view. The distance information correspondent to each pixel could be used to build the depth image of the whole scene and used for 3D mapping. The advantage of structured-light 3D scanners is speed and precision. Instead of scanning one point at a time, structured light scanners scan multiple points or the entire field of view at once. Scanning an entire field of view in a fraction of a second generates profiles that are exponentially more precise than laser triangulation.

Emitter

Figure 9:
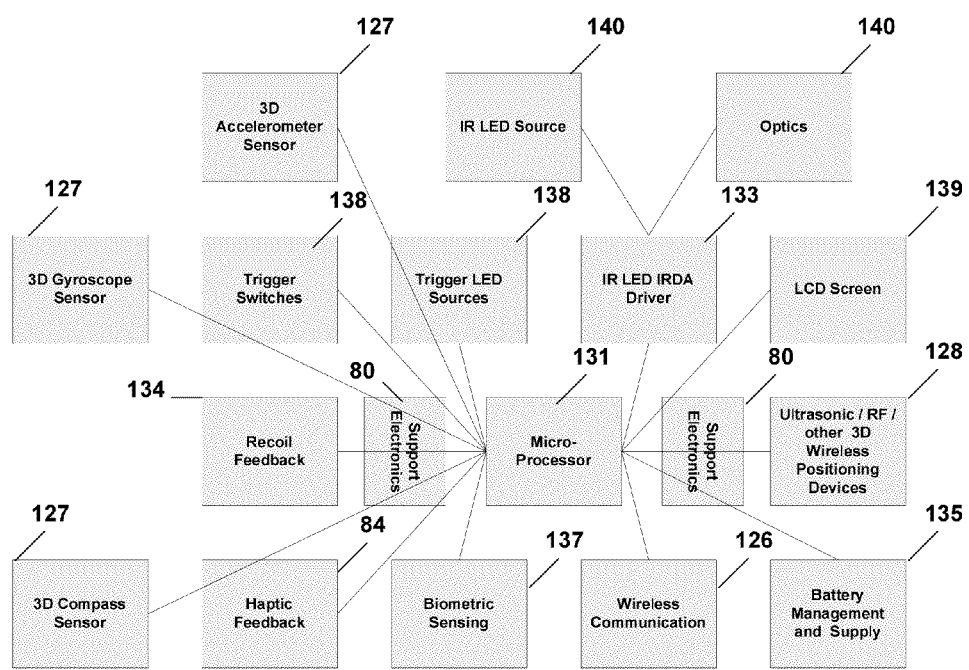
FIG. 9 shows sample block diagram of an emitter showing the possible sub devices that can be used.
Figure 10:
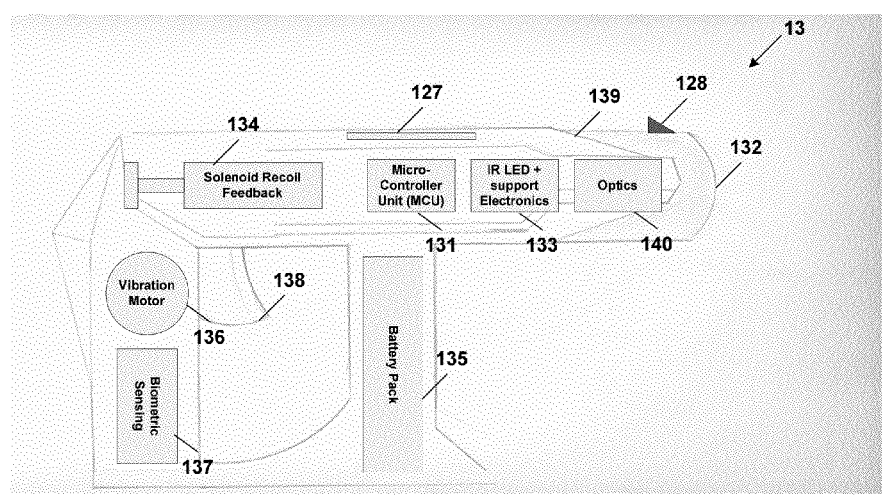
FIG. 10 shows sample emitter with sub devices and components.

Referring to FIGS. 9 and 10, the emitter 13 comprises of a Micro Controller Unit (MCU) 131, a Inertial Measurement System (IMU) 127, an ultrasonic/RF or other 3D wireless positioning devices 128, a color wheel for visual image 132, an IR LED and support electronics 133, a wireless communication hardware 126, a solenoid for recoil feedback 134, a battery pack and management supply 135, a vibration motor 136, a biometric sensing 137, a trigger switches and LED source 138, a LCD screen 139 and optics 140 that connects through wired or wireless communication hardware.

FIG. 9 is a sample block diagram of the emitter. Most of the components are connected directly to the processor 131, with support electronics 80. A 9 DOF may be fixed to the emitter for direction, orientation and speed calculations in the form of a 3D compass 127, a 3D gyroscope 127, and a 3D accelerometer 127. The emitter may have recoil feedback 134. This may be realized using a solenoid that is triggered every time the emitter is activated. The emitter may be activated using a push button or strain gauge. These may send signals back to the microprocessor to signal that the user has sent a request. For example, in a game of laser tag, the user may activate the trigger by pressing a push button that sends a request to emit an IR beam. Haptic feedback may be in the form of vibration motors which are also activated every time the emitter is activated. Biometric sensors on the emitter also send information about the user's health status, such as heart rate, to the visor. This information is used to alter the emitter to mimic a real life situation. For example, if a user's heart rate increases during a game of laser tag, the emitter may begin to vibrate so the user will lose accuracy. When the trigger is depressed, coloured LEDs located on the emitter are activated as well. These LEDs will be used by the visor to notify the user when an emitter is activated. The visor may augment images over this light to mimic some real life event. For example, in a game of laser tag, the light may be augmented to mimic the muzzle of a gun firing. The emitter communicates with other receivers using IR communication. An IR LED driver operates the IR LED source to modulate the signal that is sent. This signal is collimated using optics. An LCD screen is fitted to the emitter to display any information related to the user's emitter, for example, in a game of laser tag, ammo or type of gun. The battery management unit will be connected directly to the processor. This will supply and manage the device power.

The emitter 13 is an accessory to the visor 12 in which it systematically emits modulated or non-modulated infrared (IR) frequency or any other forms of light emission onto a receiver(s) area. There can be more than one emitter 13. It provides a greater level of user feedback as well as a key alternative method to communication to other users. For example, an emitter 13 can be used as a laser tag gun in conjunction with recoil feedback, haptic feedback vibrations and as well as other features that can be used to tag another user's receiver(s) 14 (vest). The emitter 13 is equipped with a color wheel 132 or other colored or light emitted source(s) that, when triggered, will change colors at a specified frequency. Seen through the visor's visual inputs, special effects can be generated that mimic firing of weapons, laser beams or other forms of CGI effects. The emitter(s) can also use additional sensors such as a singularity or plurality of accurate 3-axis compass 127, 3-axis accelerometer(s) 127, 3-axis gyroscope(s) 127, and altimeter(s) 127, which can be used to generate effects showcasing the trajectory and position of the fired gun(s) and/or in-game event(s). Other users will be able to see the path and effects of the fired gun(s) and/or in-game event(s) if they are within viewing range. This will create a heightened level of excitement and game play because users are able to view and experience in real time the result of their in-game actions.

Figure 11:
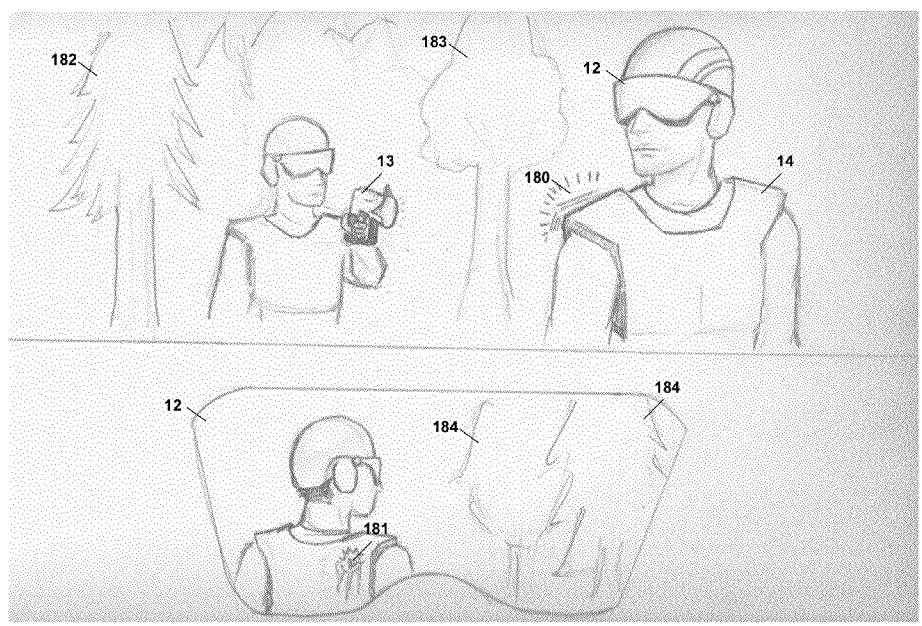
FIG. 11 shows example of tag during gameplay in users view and the CGI effects.

The emitter 13 in the reference example used in present invention, is similar to the laser tag gun, which uses one or more emitters. The laser tag emitter 13 shoots a modulated laser frequency at a receiver(s) 14, the impact of which is determined by the frequency or data signal of infrared data acting on the receiver(s) 14 as shown in FIG. 11. The receiver 14 senses the frequency of the laser emissions generated by the emitter source. The impact of damage on the receiver of the device that is hit will be determined by the frequency of emissions from the emitter 13. For example, the emitter 13 device can be a laser tag gun 13 that comprises of a solenoid with an actuator placed in with electronics and sensors on it providing a level of recoil effect and causing human fatigue depending on type of laser tag gun used.

When the emitter 13, is fired, a force is exerted (recoil force(s) or vibration force(s)), creating a unique level of game play. Attributes such as firing range, firing intensity, and firing frequency will be unique to each emitter and each emitter will have an associated behaviour. The laser emitter can also have biometric sensing to enhance user sensitivity to gaming by measuring human vitals and reporting to the visor or central console for an extra level of processing. For example, increased heart rate can cause the haptic feedback to activate and thus further reduce accuracy and increase the difficulty of hitting the target. If the user's state of health changes, the haptic sensors are triggered to change the firing impact of the device. Sensors read the health status of the user and cause the emitter 13 to vibrate.

Again referring to FIG. 11, the vest 14 with embedded receivers react to emitters 13 signals by vibration, shock and emitting a global light source 180 to be detected by other visors 12. The detection through the visor will see augmented CGI based special effects like wounds, bullet firing, blood, gore or other types of effects 181. Also real world environment overlaid with CGI effects and animations. An entire augmented world can also be created like the trees 182,183, 184.

Receiver

The receiver 14 is an accessory with the main responsibility of accepting and processing IR emissions from the emitter 13. It also provides physical feedback to the user wearing the receiver 14 and provides a visual input to other users' visors 12 to see the virtual damage on the receiver 14. One or more receivers can be placed anywhere on the body. There is a main processor (for all receivers) which can be a microcontroller or a microprocessor as shown in FIGS. 12 and 13.

Figure 12:
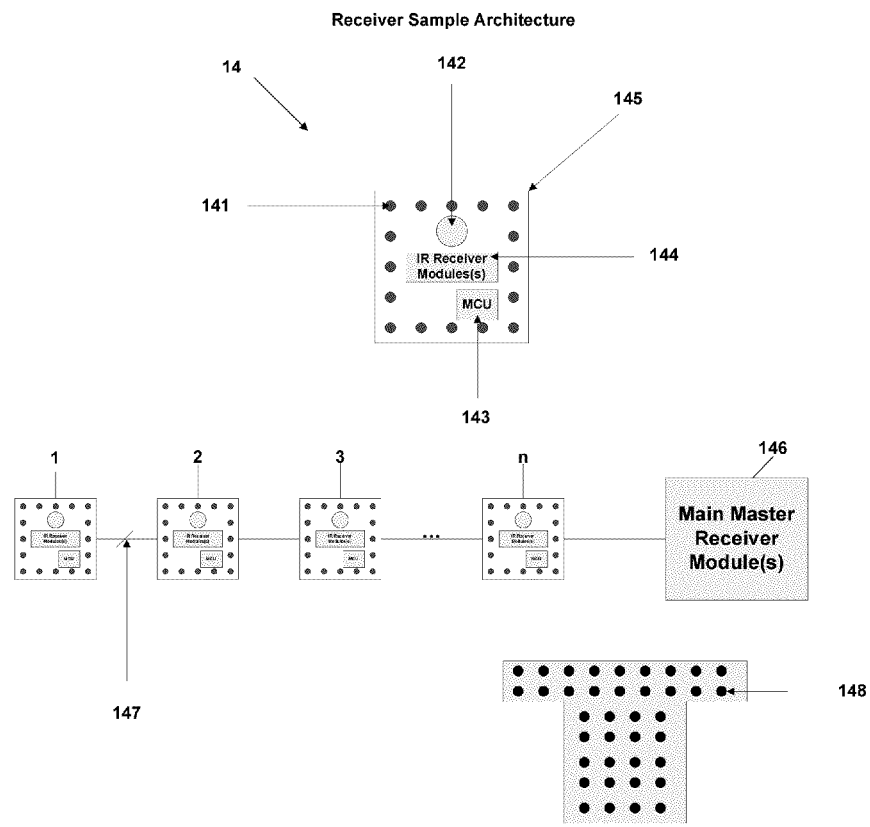
FIG. 12 shows sample receiver architecture and physical usage on a T-Shirt.
Figure 13:
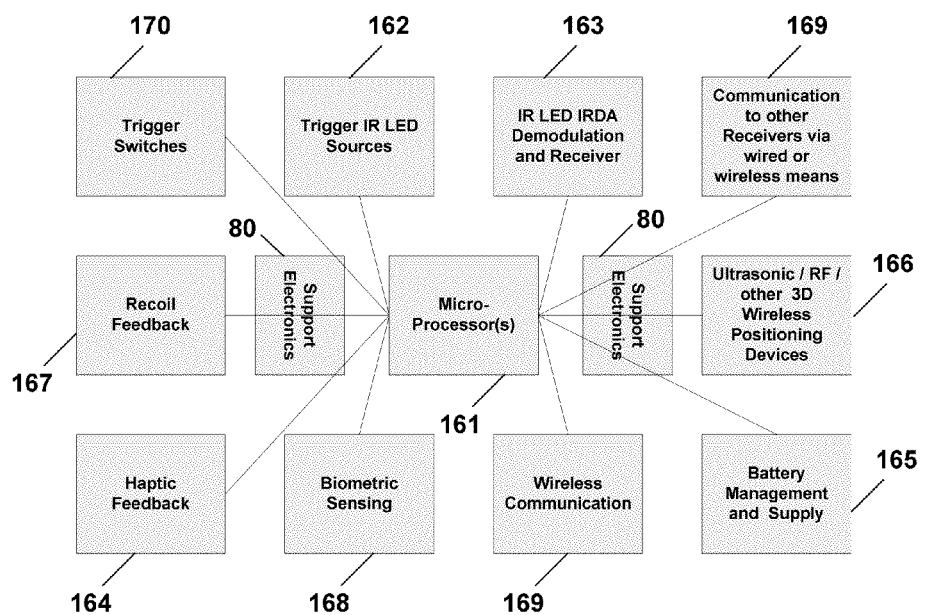
FIG. 13 shows sample block diagram of a receiver(s) and showing the possible sub-devices.

Referring to FIG. 12, a receiver 14 comprises a plurality of IR LED's 141 for visual stimulus for all visors of play, a vibration motor 142, a MCU 143 responsible for local receiver management and communication to other adjacent receiver(s) and master receiver module(s), a photodiode, IR Transceiver 144 which filters out signals and present data bits to MCU 143 and a flexible PCBA 145 or standard PCBA material. Main master receiver module(s) 146 are responsible for the communication and master control of all the receivers on its communication chain 147. All described equipment can be tailored design for a specific purpose like a shirt 148 for a specific usage.

When the laser emitter 13 emits modulated IR light (similar to a TV remote control) onto the IR sensors 141 which are located on the receiver 14, a photo receiver 144 accepts the light and sends the signal to a decoder to extract the data. The decoder then sends the data to a processor 143 to determine the appropriate event. Each IR sensor 141 will have its own processor 143, either a microcontroller or a microprocessor. This processor will be a slave to the main processor of the receiver.

One example of a receiver is a vest in a laser tag type game. IR sensors are placed all over the vest. When the processor detects that a user was tagged, IR emitters that are placed around the sensor are activated. The IR emitters oscillate at a frequency specified by the processor. The processor determines the frequency of oscillation by the type of signal that is sent. For example, in a game of laser tag, a user may have different types of guns. The IR emission of the different types of guns will be different. When the emission from the vest is viewed through the visor, the user will see CGI and special effects in that area. Other types of feedback will be given back to the user as well. If a user is tagged, then vibrator motors will be activated in order to give some type of haptic feedback. The receiver can also be fitted with eccentric mass motors for more haptic feedback and biometric sensors. These sensors will measure health statistics such as heart rate and blood pressure, among others.

The visor can have a measurement system with up to 9 degrees-of-freedom or greater depending on the level of sensor acquisition required, developed using inertial measurement units (IMUs) that can know the orientation, rotation, speed, altitude, etc. of the visor. This allows for coordinates of the receiver to be mapped. The receiver area can also use 2D/3D scanning laser rangefinders as part of its design. The receiver can have explosion mimicking sensors and other types of environmental mimicking effects can be added to the graphics processing of the visor or central console to create a surreal gaming experience as shown in FIG. 12.

FIG. 13 explains a possible setup for the receiver. A receiver may consist of one or more receiver modules as well as other peripherals. All devices are connected directly to a microprocessor 161. A receiver module may consist of a microprocessor 161, IR LED sources 162, an IR sensor 163, and haptic feedback 164, along with support electronics 80. When an IR sensor 163 senses modulated IR light, IR LEDs begin to emit light and the user experiences haptic feedback 164. This haptic feedback 164 may be in the form of vibrator motors attached or around the module. The IR light is detected by the visor and graphics are overlaid on the visor over the area of the light. For example, in a game of laser tag, if the user is "tagged" by another user, the IR LEDs will begin to emit light and the visor may display blood squirting out of that area. There is only one master receiver module. The other modules are slaves to the master. Along with the receiver modules are biometric sensors 168 that react to the physiological changes of the body. These signals are sent back to the microprocessor 161 to adjust the settings of the systems to compensate for these effects. A battery and management supply system 165 is used to manage the power settings. The receiver may communicate with the visor wirelessly using some type of wireless communication protocol. Local positioning 166 is accomplished using ultrasonic, RF or some other type of 3D positioning device. Recoil feedback 167, may be used when the receiver needs to respond in the manner of a receiver. For example, in a game of augmented reality tennis, the receiver may be the racket when receiving the ball, but then may act as the emitter when hitting the ball back where a trigger switch 170 is used to activate the emitter.

IR Communication Between Emitter and Receiver

The systems use IR communication to transfer emitter parameters to the receiver. This is to provide a level of data transfer between players of the game. For example, in a Laser tag shooter game, the emitter will traditionally tag the receiver(s) using a collimated light source. If the receiver detects the light source, it will recognize that it has been hit. Alternatively, this concept uses a more sophisticated approach to when receivers are being triggered by emitters. The emitter initiates data transfer to the receiver via a modulated frequency signal. The data is transferred to the receiver and is processed for key game parameters such as type of gun hit, type of blast, type of impact, the user ID, and other parameters using IR communication. This allows for a more accurate reaction between multiple emitters of varying types to be processed as different type of effects. For example, if an in-game virtual IR explosion was to occur, the data transferred to the receiver will trigger an explosion-based reaction on the receiver(s) which in turn will produce a specified desired effect on the visor(s). The visor(s) will create imagery specific to the desired effect based on the receiver(s) IR light frequency and use this information to overlay the required visual effect. The IR communication in this example is a half-duplex communication between the emitter(s) and receiver(s) but a full duplex IR communication can be used for other types of gameplay.

Figure 17:
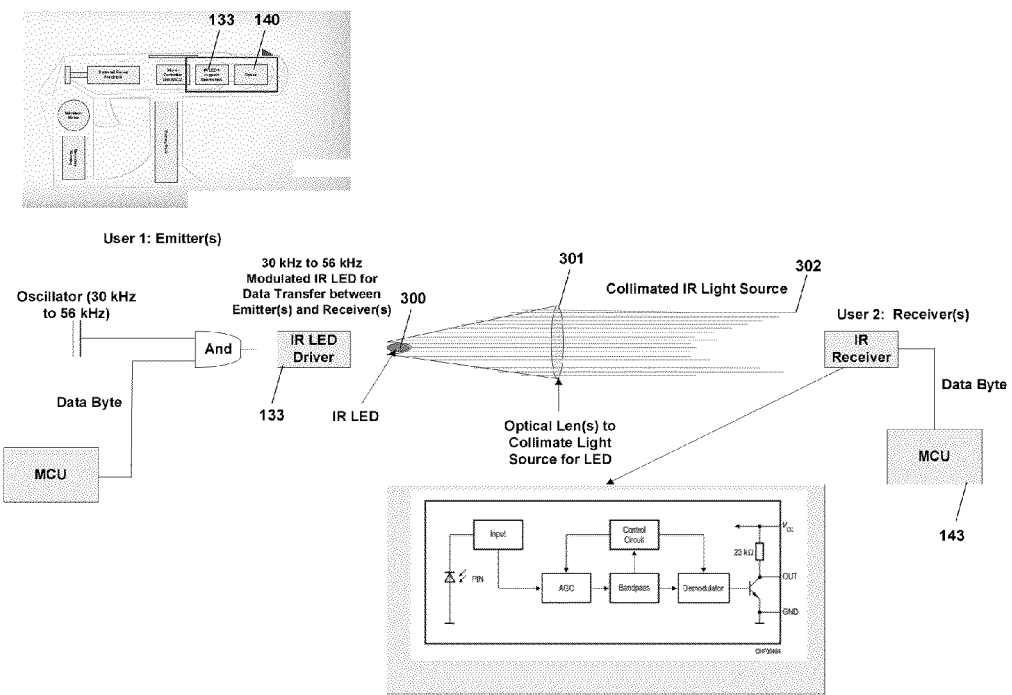
FIG. 17 shows the conceptual approach to how the IR Emitter/Receiver communication is completed.

As shown in FIG. 17, the system uses an IR LED source 300 with a collimation lens 301 to provide a collimated light 302 output, so as not to saturate other receivers which could cause a diffused light effect if the incorrect target receiver is targeted. The IR LED source 300 is modulated with a carrier frequency to reduce the effect of solar noise or other types of light emitted noises. The IR receiver will demodulate or remove the frequency portion of the light signal and filter it to just the output data. The data is then sent to the processing unit 143 for processing and to determine the actions required for that data, such as activating the IR LEDs.

2D/3D Local Positioning System (LPS)

Each user's device location is known through a means of wireless positioning. This can be accomplished in a variety of ways such as ultrasonic, RF, RFID, Wi-Fi, GPS, magnetic sensing or other wireless communication peripherals. Using time of flight, phase shift modulation or other wireless triangulation algorithms, the system and/or its devices can be precisely located. For example, if the emitter device is a laser tag gun, a visor detects the laser tag gun is fired or shooting at a target. It can generate an augmented laser beam that is projected out in the direction of the IR laser beam by knowing the position and orientation of the laser tag gun in 3D space. This allows it to map the laser tag gun's location and orientation to determine the global direction of beam blasts, as well as other CGI effects. This is relayed not only to the user holding the emitter, but all users of the game wearing the visor because the CGI effects are made global through the game play. In the design featured below, an ultrasonic positioning system was used as it is the low cost, high precision positioner. Ultrasound is confined to the area in which it operates and thus will require transponders or repeaters for multi room locations. Here, the base station or console station will have several receivers at its base location and the transmitters will be located on the devices. The receivers and transmitters can also be interchanged so that the transmitters are at the base station and receivers are on the devices that are being tracked. The positioning system entails that receivers are fixed in a location with known geometric properties of their positions to each other. A minimum of three receivers are required to calculate the 3D position of the objects being tracked with transmitters, however, more receivers mean greater precision and accuracy of the tracked object. If there are many receiver base stations, transponders or receiver-to-transmitter-to-receiver triangulation and or trilateration can be used to determine the location and orientation of the other base stations with respect to the master receiver base station.

Figure 18:
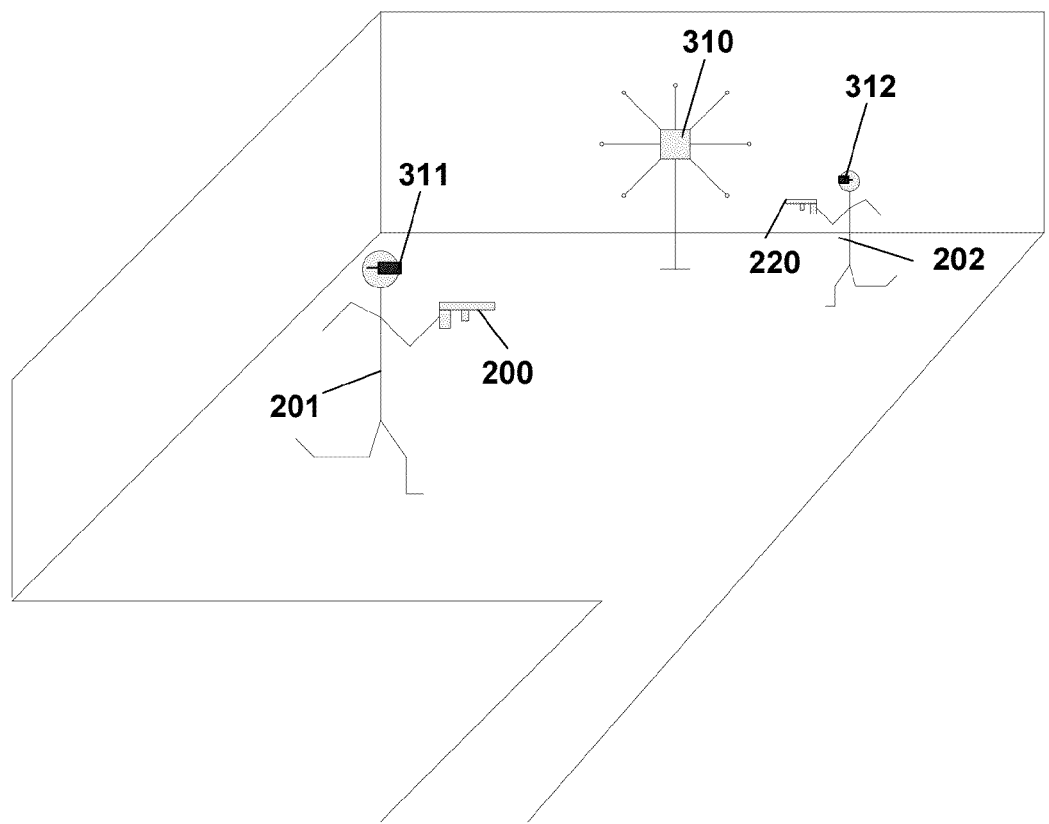
FIG. 18 shows the function of central control station or console station and the interaction of multiple users in the game play. The LPS determines the location of the users in 3D space with reference to the console station.

As shown in FIG. 18, local positioning system shows laser tag game play by providing global virtual effects for all users 201,202, of play. Console station 310, with wireless communication such as Wi-Fi and with also embedded ultrasonic or other wireless LPS base beacon station communicates with each player's visor 311, 312, and emitters 200, 220. Each player's visor 311, 312, sends back its location from the base station 310, as the reference point in 3D (x,y,z). A player's emitter 200, 220, or other accessories can also be positioned in space to determine point with it lies in respect to the visor and the base station. This is an essential requirement for global virtual effects by knowing the where each accessory is in space and what action it is performing. For example, the emitter 200, 220, with its positioning and 3 axis compass can let each user 201, 202, know where and what direction everyone is firing from regardless of if they are in the view of the visor 311, 312.

Ultrasound sensors are based on measuring properties of sound waves within a certain frequency outside the human audible range. They can be analyzed using time of flight, the Doppler Effect, or the attenuation of sound waves. They operate by generating a frequency pulse of sound around 40 kHz and then receiving the signal from the reflection of an object(s). In the system being described here, time of flight analysis of ultrasonic transmission is analyzed to determine the distance of tags with respect to the receiver(s). The receiver are positioned apart with fixed and known angles and distances and will sense the ultrasound "ping" and uses its time of flight algorithm to determine the distance between the receivers and the transmitters.

Figure 19:
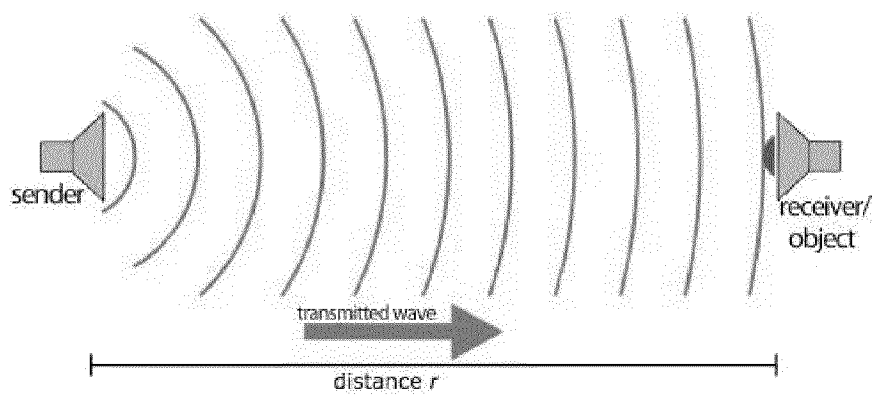
FIG. 19 shows ultrasonic signals travelling to the receiver object.

As shown in FIG. 19, an ultrasonic transmitter emits a short burst of sound in a known direction. The pulse then bounces off targets or objects and returns to the receiver(s) after a certain amount of time. The processing unit then measures the time interval between transmission and receiving of the ultrasonic signal and determines the location with the formula distance=speed of sound*time/2. The system described in present invention, uses another approach because the receiver(s) are at fixed and known locations and the transmitters are free to move. From the distance between the transmitter and at least three receivers, we can determine three different distances from the transmitter to the receiver. This is sufficient information to determine the transmitter's position in 3D space.

Figure 20:
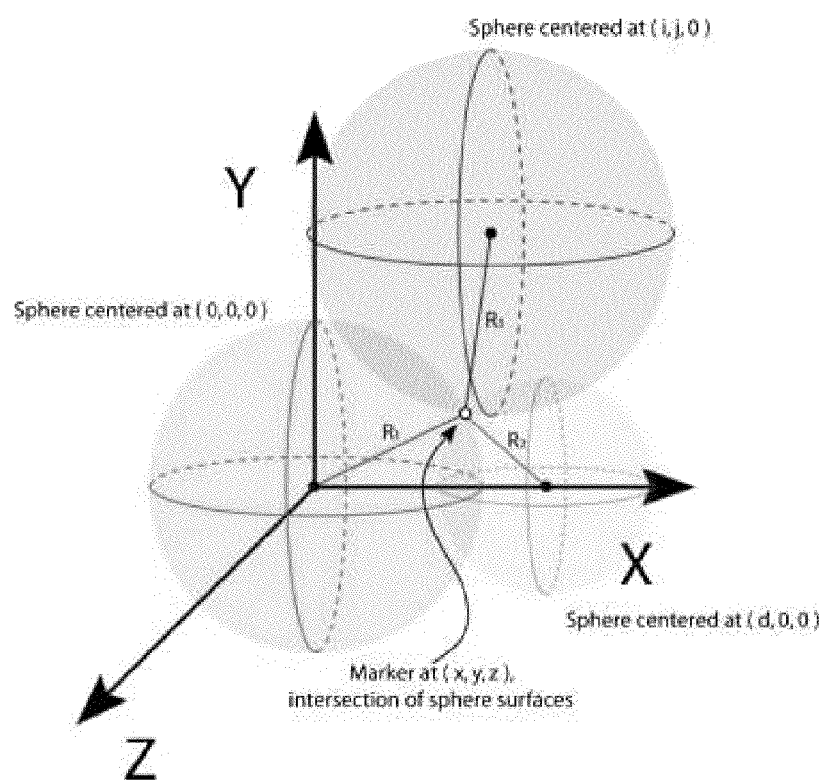
FIG. 20 shows the intersection of three spheres to determine 3D positioning using trilateration.
Figure 21:
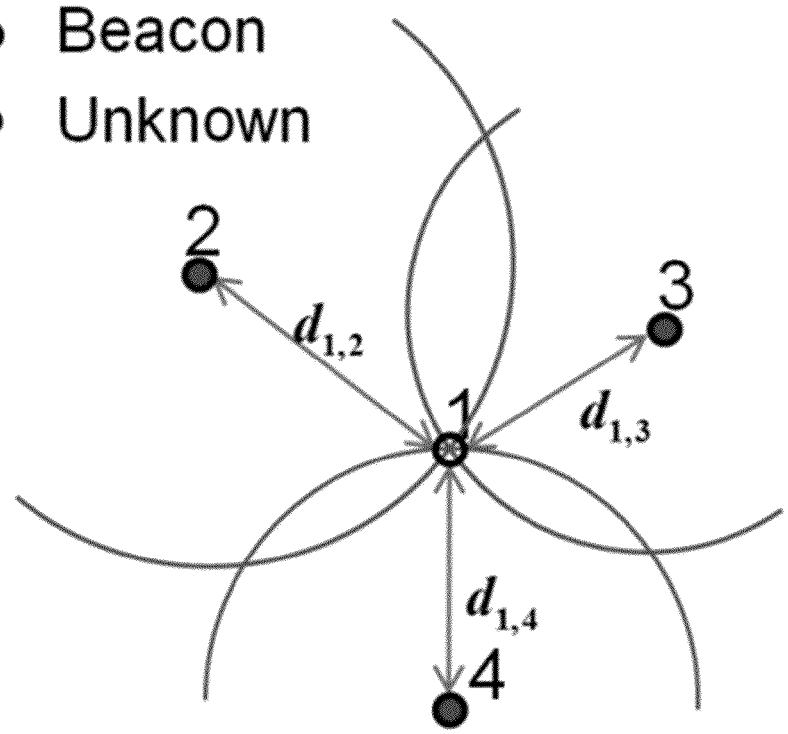
FIG. 21 shows a 2D view of trilateration.

As the transmitter sends its "pings", several receiver(s) will measure the performance of space and thus the processing unit will use triangulation and/or trilateration to determine the position of the transmitter. Trilateration is used to find the position of an object by determining the measured distances between the receivers and the transmitter(s) as shown in FIGS. 20 and 21. Triangulation is used to determine the position by measuring the angles between the receivers and the transmitter(s). The onboard computer can triangulate the position and/or orientation in 3D space of the transmitters which we can call tags. In the system here, it is best to use trilateration and thus we start by knowing the equation of a sphere, S, centered at each receiver position $(x_1,y_1,z_1)$, with a system of N receivers we will have N≥3 equations of spheres for determining a 3D position:

$$(x_1-x)^2+(y_1-y)^2+(z_1-z)^2=S^2$$

There will be N number of the above equation for a sphere, and thus with we can solve for the most probable (x,y,z) point by solving the equations for intersection points. If the points are not intersecting, the midpoint of the intersections will be the point of the transmitter. As mentioned earlier, when there are more receivers the level of accuracy is increased.

Upon determining the 3D position of the transmitters, the transmitter positions are sent back to the central console station or to the visor(s) on the determined positions of all users in the gameplay. This allows all users of the game to know their 3D position on the game map.

Figure 23:
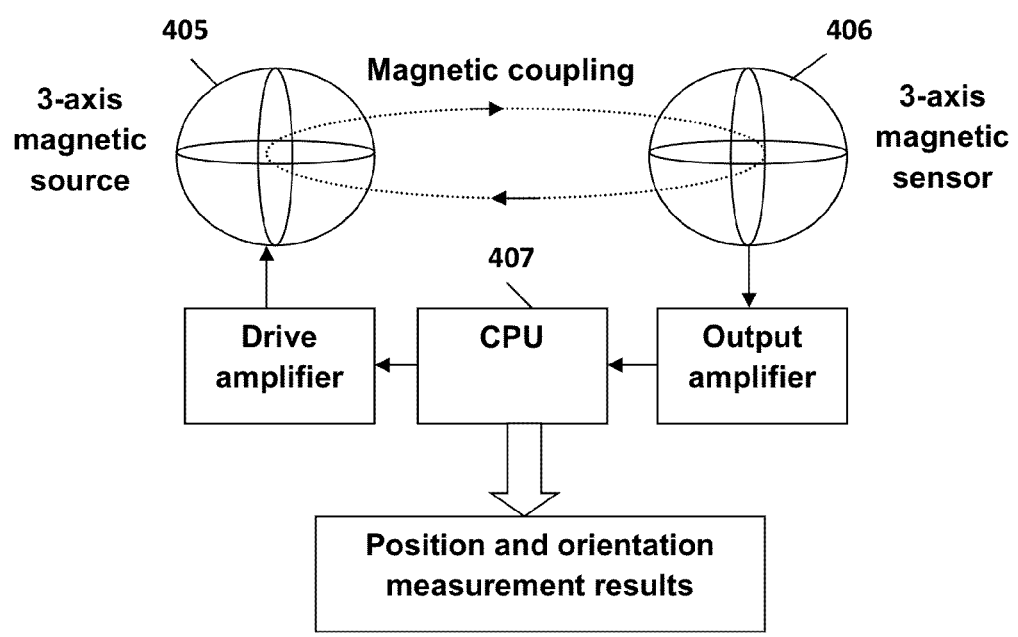
FIG. 23 shows system block diagram of magnetic position and orientation system.

Magnetic Position and Orientation Tracking System for Multi-Room and Multi-Level Gaming Low-frequency quasi-static magnetic fields have been used in the measurement of short-range positioning or orientation. The measurement technique is based on the free-space field geometry or the effects of a nearby conducting element. In principle, the generation of three-axis quasi-static magnetic fields by a magnetic source and the sensing of these fields by a sensor provide enough information to determine the position and orientation of the sensor relative to the source. FIG. 23 shows the block diagram of the magnetic position and orientation tracking system.

As shown in FIG. 23, the 3-axis magnetic-source 405 generates a quasi-static magnetic field (weak). Then, the 3-axis sensor 406 senses this field, and computes its position and orientation relative to the source, and relays this data to the CPU 407.

To extend this application to the gaming systems, the magnetic-source, sensor and CPU can be considered as the base-station, controller or remote and game-console or PC, respectively. The magnetic-source and drive amplifier together can form the base-station. Similarly, the magnetic sensor and output amplifier can be combined together to form the controller which is typically carried by the player. More conveniently, a wireless communication can be established among the CPU, and base-station and controller. The advanced algorithm in the CPU can compute precise 3-D position and orientation of the sensor or the controller. The gaming system based on the magnetic position and tracking will have the following features:

1. No line-of-sight restrictions between the controller, base-station, CPU and display unit;
2. Drift-free measurements of the position and orientation of the controller or the sensor;
3. Building-wide coverage using many numbers of synchronized wireless base-stations;
4. Can provide localized coverage with the wireless base-station on body and can allow for non-confined area of portable play.
5. Position accuracy within a mm-range resolution;
6. Any number of sensor units or controllers (or players), all providing measurements in a common frame;
7. Using existing simple wireless communication and protocol (IEEE 802.15.4 or IEEE 802.15.11n);
8. No baselines needed for attitude;
9. No FCC restrictions because of the low-frequency magnetic field; and
10. No Health hazardous because of the static and weak magnetic field.

Additional Peripherals

The system also utilizes or can utilize an array of surround sounds to provide an even greater level entertainment and feedback to the users.

The system can use other types of biometric sensing to measure other human vitals to be used as inputs for gameplay.

Vibration motors can be substituted with deep bass sound systems to provide a different type of effect for vibration feedback.

Application of Use

Simulated Sport(s) systems utilizing specialized sensors to allow users to play active sporting games against real life augmented opponents or augmented environments. Sensors can be made to add or mimic the touch of physical sports accessories and using these accessories, players can interact with fictional opponents and real life team members. In the sports systems, the additions of accelerometers are essential to the proper input to the physics calculations of the sport and sport related accessories. Such sport systems can be any variety or combination of baseball, boxing, basketball, soccer, football, or any other type of sports.

The Emitters and Receivers can be used to interact in a global environment to provide a surreal gaming experience. Special foot sensor accessories can be created to allow for mapping the trajectory of the feet to provide the required inputs for the central control station or local visor to determine the correct response to the event. Another example is an AR table tennis, where users can play against any wall where the ball is fully virtual and the opposing opponent can be augmented onto the wall. With a quality computer physics engine and high quality graphics, the gameplay can be very realistic. Virtual games can be played against top athletes in their fields. Users will be able to simulate competitions with top athletes (the personalities and signature moves of those athletes could be incorporated into the game) thereby enhancing the user's game play experience.

Role playing systems or mystery, science fiction and other type of games can be developed.

Can be used in defense training and simulations for personnel to experience real life mission scenarios in a fully immersed simulated environment.

Can be used in the medical field such as to aid in surgical practise by non-trained medical professionals. A walk-through system can instruct personnel to conduct precise surgical techniques when required.

Create a virtual walkthrough into conceptual architectural buildings in a simulated reality for both entertainment and engineering related feedback.

Other type of shooter or defense related technologies can be created to adapt to different games.

This device can also be used for defense related training and pre-mission training.

What is claimed is:

1. A dynamic environment and location based augmented reality (AR) system enabling one or more users to interact in a physical environment and communicate physically and virtually based on augmented reality, said AR system comprising:
   a plurality of interactive devices comprising emitters and receivers;
   at least one visor, each visor being wearable by one of the users, each visor being in communication with at least a subset of the plurality of interactive devices, each visor comprising:
      a range finder scanning system to scan and analyze said physical environment and to develop a map of the physical environment from the perspective of the user;
      a local positioning system to identify the location of said user with respect to said physical environment, said user being in the same or different locations as the other of said users, and to identify the location of said emitters and receivers with respect to said physical environment;
   a central console in communication with the at least one visor, the central console having a processor configured to:
      combine each said map for each said visor and the location of each said users into a computer generated virtual environment;
      generate an augmented game play environment by combining portions of said physical environment and said virtual environment;
   dynamically collect data from said visors, said data corresponding to: a dynamic or static map of the physical environment; locations of all visors, emitters and receivers with respect to the physical environment; and direction, orientation and speed of all users; and
   enable communication between all users and the physical environment in the augmented environment and to dynamically change the game play environment, said AR system providing a substantially real time adaptive game play in changing environments and locations.

2. The system of claim 1, wherein said receiver comprises:
   a. a plurality of receiver modules comprising:
      i. at least one IR sensor to sense an IR beam emitted from one of said emitters,
      ii. at least one IR light source configured to emit a signal when said IR sensors sense said IR beams,
      iii. a haptic feedback module configured to provide haptic feedback when said IR sensors sense said IR beams,
      iv. at least one biometric sensor to react to physiological changes of the user's body, and
      v. a microprocessor to process data collected by said receiver modules;
   b. a wireless positioning system to enable a corresponding one of said visors to locate said receiver;
   c. means to determine direction, orientation and speed of the receiver;
   d. a battery management and supply unit to provide power to the receiver; and
   e. an IR transceiver to operate when said receiver acts as said emitter.

3. The system of claim 1, wherein said processor of said central console is further configured to identify all users that are in the same physical environment, and to combine the map, location, and speed of each of said users' corresponding visors and interactive devices, to locate all users in the same augmented environment for said game play.

4. The system of claim 1, wherein said processor of said central console is further configured to superpose graphics, sounds, and haptic feedback to the augmented environment.

5. The system of claim 1, said processor of said central console is configured to adaptively and dynamically learn the physical environment.

6. The system of claim 1, wherein said scanning system comprises means to scan and generate a 2D or 3D virtual environment.

7. The system of claim 1, wherein said central console processes data from said scanning system, creates logical arrangement for said local positioning system, recognizes and produces said game play environment, manages said interactive devices, performs a wide variety of central play calculations, algorithms, game management and generates said augmented environment of said physical environment, whereby said users interact through said central console even if said users are at different locations and having different physical environment, and wherein said individual maps from each user being combined to make a central game environment.

8. The system of claim 1, wherein said game play environment further comprises walls, rooms, doors, trees, hallways, or other physical media in 2D or 3D, obstacles, characters added into the augmented environment, and means to create fog to limit the view of the user to a certain distance.

9. The system of claim 1, wherein said central console comprises means to receive and manage the global position of each user, and solve time, positioning and mapping conflicts that occur between said users and interactive devices.

10. The system of claim 1, wherein said AR system comprises biometric sensors to measure human vitals to be used as inputs for gameplay, whereby said human vitals are used to alter the emitter to mimic a real life situation.

11. The system of claim 1, wherein said game play environment is a laser tag game, said emitters are virtual laser guns, and said receivers are vests worn by the users said emitters and receivers each having a unique ID.

12. The system of claim 11, wherein upon a first of said users virtually firing one of said virtual laser guns at one of said vests worn by a second of said users:
   said vest emits its unique ID;
   said visor for said first of said users obtains said unique ID of said vest;
   said visor projects virtual damage to the vest visible to said first of said users.

13. The system of claim 12, wherein said virtual damage comprises blood, gore, explosions, smoke or other forms of special effects.

14. The system of claim 10, wherein said human vitals comprises a user's heart rate and wherein the visor causes at least one of said emitters to vibrate upon sensing an increase in said heart rate.

* * * * *